(12) United States Patent
Samant et al.

(10) Patent No.: US 8,842,809 B2
(45) Date of Patent: Sep. 23, 2014

(54) METHOD AND APPARATUS FOR X-RAY RADIOGRAPHIC IMAGING

(75) Inventors: Sanjiv Singh Samant, Gainesville, FL (US); Arun Gopal, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 270 days.

(21) Appl. No.: 12/996,718

(22) PCT Filed: Jul. 7, 2009

(86) PCT No.: PCT/US2009/049824
§ 371 (c)(1),
(2), (4) Date: Dec. 7, 2010

(87) PCT Pub. No.: WO2010/005977
PCT Pub. Date: Jan. 14, 2010

(65) Prior Publication Data
US 2011/0110490 A1    May 12, 2011

Related U.S. Application Data

(60) Provisional application No. 61/078,712, filed on Jul. 7, 2008.

(51) Int. Cl.
| | |
|---|---|
| G21K 3/00 | (2006.01) |
| G21K 1/02 | (2006.01) |
| G02B 6/10 | (2006.01) |
| G02B 6/43 | (2006.01) |
| G01T 1/20 | (2006.01) |

(52) U.S. Cl.
CPC ........................... *G01T 1/20* (2013.01)
USPC ........................... 378/154; 378/186

(58) Field of Classification Search
CPC ............ G21K 1/00; G21K 1/02; G21K 3/00; G02B 6/00; G02B 6/10; G02B 6/4295; G02B 6/4298; G02B 6/43; G02F 1/025
USPC ............... 378/7, 19, 147, 149, 154, 155, 185, 378/186, 204, 210; 250/370.01, 370.06, 250/370.08, 370.09, 370.11, 370.14, 397

See application file for complete search history.

(56) References Cited

U.S. PATENT DOCUMENTS

| | | |
|---|---|---|
| 4,734,588 A | 3/1988 | Akai |
| 4,945,243 A | 7/1990 | Arques |

(Continued)

FOREIGN PATENT DOCUMENTS

| | | |
|---|---|---|
| DE | 10 2006 042 484 A1 | 10/2007 |
| JP | 2004-085250 A | 3/2004 |
| JP | 2007-248283 A | 9/2007 |

OTHER PUBLICATIONS

Appleby, M., et al., "Tomo-Lithographic-Molding (TLM™)—A Breakthrough Manufacturing Process for Large Area Micro-Mechanical Systems," Jun. 2005, NASA Earth-Sun System Technology Conference, College Park, MD.

(Continued)

*Primary Examiner* — Anastasia Midkiff
(74) *Attorney, Agent, or Firm* — Saliwanchik, Lloyd & Eisenschenk

(57) ABSTRACT

Embodiments of the invention relate to a method for x-ray radiography and apparatus for use in x-ray radiography. Specific embodiments can utilize a grid having a plurality of apertures therethrough with optical waveguides positioned in the apertures. The optical waveguides can incorporate a scintillating material, preferably throughout, that absorbs incident x-ray radiation and emits light that is then guided by the optical waveguide. In a specific embodiment, x-ray radiation incident on a first end of the aperture is absorbed by the scintillating material in the optical waveguide and light is emitted by the same scintillating material, a portion of which is guided by the optical waveguide to a second end of the aperture. In addition, secondary electrons created by absorption of the x-ray radiation by the scintillating material can be absorbed by the scintillating material to create more light such that a magnification effect can occur. The light exiting the second end of the aperture can then be detected.

55 Claims, 4 Drawing Sheets

(56) References Cited

U.S. PATENT DOCUMENTS

| | | |
|---|---|---|
| 5,041,729 A | 8/1991 | Takahashi et al. |
| 5,401,668 A | 3/1995 | Kwasnick et al. |
| 5,548,123 A | 8/1996 | Perez-Mendez et al. |
| 5,864,146 A | 1/1999 | Karellas |
| 5,905,263 A | 5/1999 | Nishizawa et al. |
| 6,310,358 B1 | 10/2001 | Zur |
| 6,717,174 B2 | 4/2004 | Karellas |
| 6,996,209 B2 | 2/2006 | Marek |
| 7,208,007 B2 * | 4/2007 | Nightingale et al. ........... 607/90 |
| 7,482,602 B2 | 1/2009 | Shoji et al. |
| 2003/0128812 A1 | 7/2003 | Appleby et al. |
| 2004/0028181 A1 | 2/2004 | Charles Jr et al. |
| 2004/0156478 A1 | 8/2004 | Appleby et al. |
| 2004/0264628 A1 | 12/2004 | Besson |
| 2005/0220265 A1 | 10/2005 | Besson |
| 2005/0265515 A1 | 12/2005 | Tashiro et al. |
| 2006/0054833 A1 | 3/2006 | Tsuchino et al. |

OTHER PUBLICATIONS

Badel, X., et al., "Performance of Scintillating Waveguides for CCD-Based X-Ray Detectors," *IEEE Transactions on Nuclear Science*, Feb. 2006, pp. 3-8, vol. 53, No. 1.

Bross, A.D., "Scintillating Plastic Optical Fiber Radiation Detectors in High Energy Particle Physics," Sep. 1991, SPIE Conference on Optical Fiber Technology, Boston, Ma.

Floyd, Jr., C.E., et al., "Imaging Characteristics of an Amorphous Silicon Flat-Panel Detector for Digital Chest Radiography," *Radiology*, Mar. 2001, pp. 683-688, vol. 218, No. 3.

Lee, B., et al., "Development of One-Dimensional Fiber-Optic Radiation Sensor for Measuring Dose Distributions of High Energy Photon Beams," *Optical Review*, Sep. 2007, pp. 351-354, vol. 14, No. 5.

Spahn, M., et al., "Digital Radiography with a Large-Area, Amorphous-Silicon, Flat-Panel X-Ray Detector System," *Investigative Radiology*, Apr. 2000, pp. 260-266, vol. 35, No. 4.

* cited by examiner

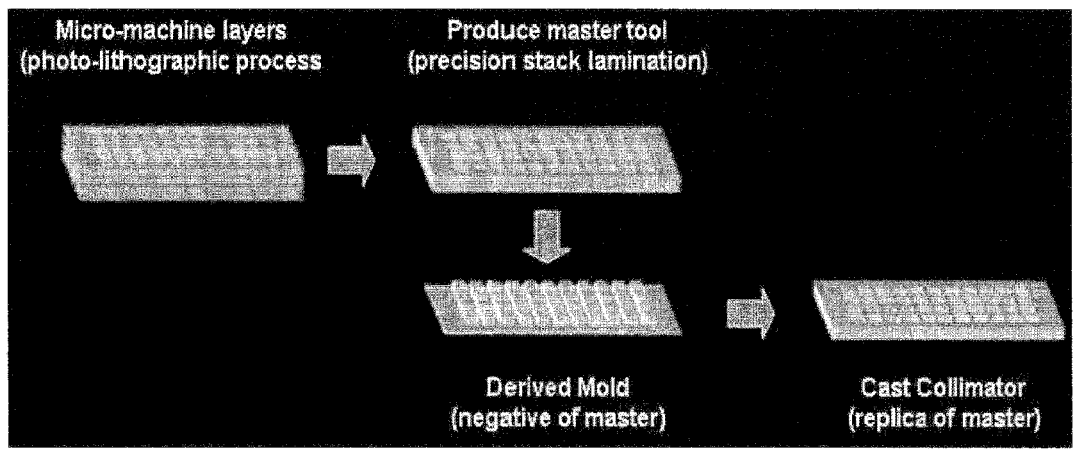
FIG. 3
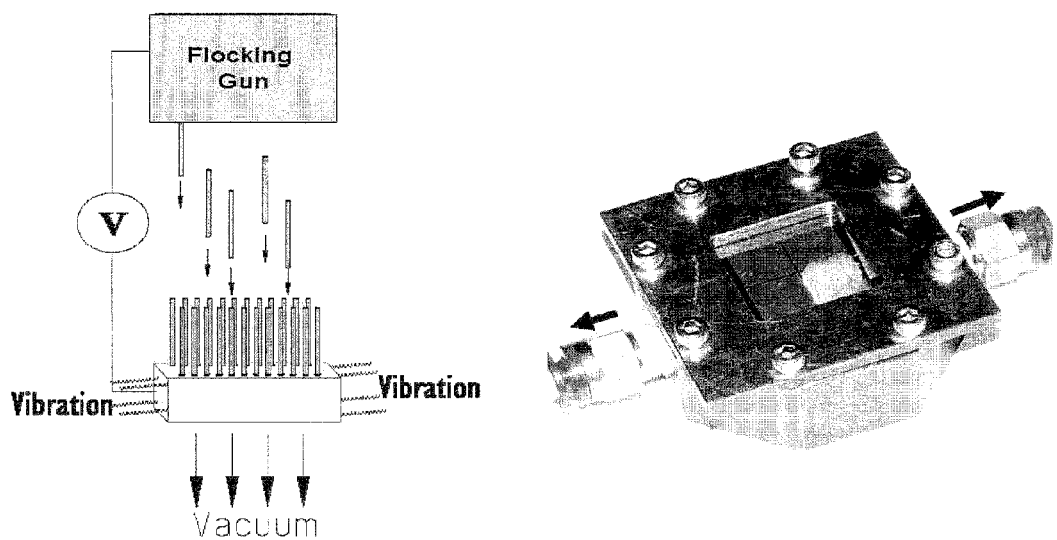
FIG. 4A
FIG. 4B ance with an embodiment of the subject invention.

METHOD AND APPARATUS FOR X-RAY RADIOGRAPHIC IMAGING

CROSS-REFERENCE TO RELATED APPLICATIONS

This application is the U.S. national stage application of International Patent Application No. PCT/US2009/049824, filed Jul. 7, 2009, which claims the benefit of U.S. Provisional Application Ser. No. 61/078,712, filed Jul. 7, 2008, the disclosures of which are hereby incorporated by reference in their entireties, including any figures, tables, or drawings.

BACKGROUND OF INVENTION

In radiographic imaging, traditional methods of radiography have been typically based on powdered luminescent phosphor screens coupled to a-Si read out arrays. This technique can have several limitations, such as light self absorption and scatter from the screen and poor quantum efficiency (QE).

Current imagers utilize unoptimized combinations of scintillators and signal readout devices with or without inter-pixel septa or grids to stop secondary electrons. Optimally designed scintillator-tungsten beds are often inefficiently produced with significant manual labor and expertise required.

BRIEF SUMMARY

Embodiments of the invention are directed to a high performance radiographic imaging method and apparatus incorporating high light output clear scintillators that are inserted into a high atomic number grid, such as tungsten, and optically matched to a plurality of light detectors, such as an array of a-Si photodiodes. Thick, high light output, scintillator-tungsten beds can provide high contrast and the grid septa between scintillator elements can stop secondary electrons and enhance spatial resolution. Additional embodiments of the invention relate to a cost effective methodology involving mass producing grids, such as tungsten alloy grids, by stack laminating microlayers fabricated by lithography. A specific embodiment employs tomolithographic molding (TLM). Scintillator elements, such as individually grown crystals, sieved crystal elements, and synthetically drawn glass/plastic scintillators, can be inserted via automated electrostatic/vacuum gradient based pixel loading. This technique provides a cost effective, accurate and mass producible method for obtaining high performance x-ray/gamma ray imagers. A specific embodiment of the subject method results in accurate fabrication (±10 µm) that is cost effective and automated. In a specific embodiment using lithography, tolerances of ±12 µm for cutting and ±27 µm for stacking can be achieved.

BRIEF DESCRIPTION OF DRAWINGS

FIG. 3 shows a technique for making a cast collimator in accordance with an embodiment of the subject invention.

FIG. 4A shows a technique for inserting scintillators in a tungsten bed in accordance with an embodiment of the subject invention.

FIG. 4B shows an apparatus for applying a vacuum and vibration in accordance with the technique shown in FIG. 4A.

DETAILED DISCLOSURE

Figure 1:
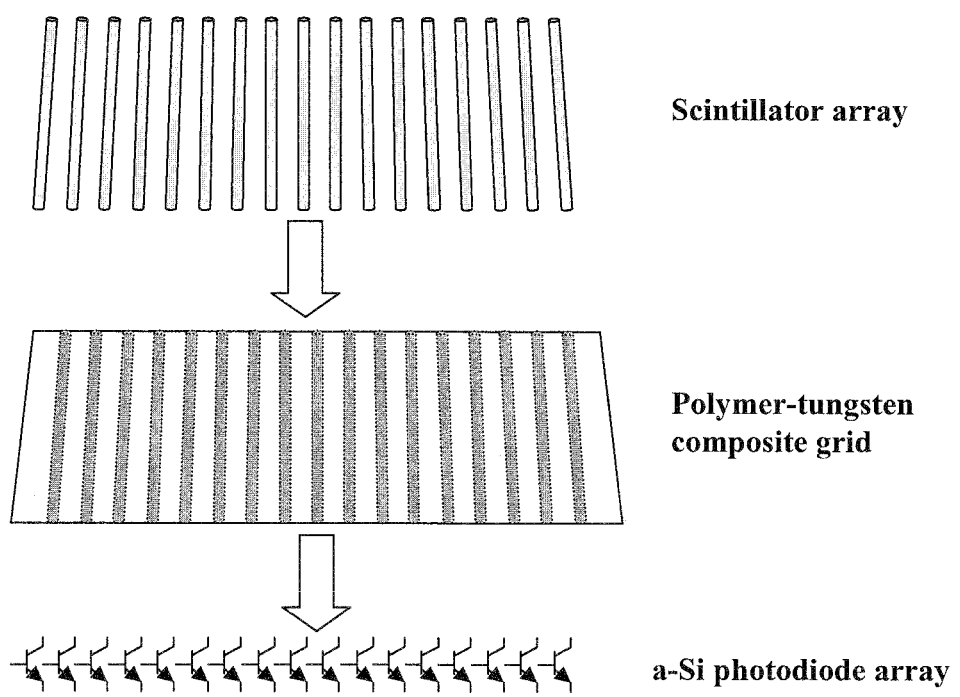
FIG. 1 shows an embodiment of an assembly method for a-Si coupled scintillator-tungsten bed detector in accordance with an embodiment of the subject invention.

Embodiments of the invention relate to a method for x-ray radiography and apparatus for use in x-ray radiography. Specific embodiments can utilize a grid having a plurality of apertures therethrough with optical waveguides positioned in the apertures. The optical waveguides can incorporate a scintillating material, preferably throughout, that absorbs incident x-ray radiation and emits light that is then guided by the optical waveguide. In a specific embodiment, x-ray radiation incident on a first end of the aperture is absorbed by the scintillating material in the optical waveguide and light is emitted by the same scintillating material, a portion of which is guided by the optical waveguide to a second end of the aperture. In addition, secondary electrons created by absorption of the x-ray radiation by the scintillating material can be absorbed by the scintillating material to create more light such that a magnification effect can occur. The light exiting the second end of the aperture can then be detected.

Embodiments of the invention relate to an apparatus for use in x-ray radiographic imaging. A specific embodiment can utilize a grid having a plurality of apertures therethrough, wherein the grid incorporates a grid material that absorbs x-ray radiation and secondary electrons created by absorption of x-rays by the optical waveguide, scintillating material, grid material, and/or cladding, such that the rate of transfer of secondary electrons from one aperture to another is reduced. A corresponding plurality of scintillator elements can be positioned within the plurality of apertures, where each of the scintillator elements has one or more optical waveguides. Each optical waveguide can incorporate a scintillating material that absorbs x-ray radiation incident on a first end of the aperture and emits light that is guided by the optical waveguide out a second end of the aperture. A corresponding plurality of light detectors can be positioned such that each light detector is positioned to detect light emitted from the second end of the corresponding aperture. In a specific embodiment, the grid material can be Lutetium Oxyorthosilicate (LSO), lead, steel, a material having an atomic number greater than Iron, tungsten, and/or a polymer composite preferably has a density exceeding 12 g/cm³. The grid can be a Bucky grid. Preferably, the grid material has an atomic number such that the x-ray radiation entering one of the apertures is screened from passing into the adjacent apertures by the grid material.

A variety of optical waveguides can be utilized to be positioned in the apertures. The optical waveguides can be glass optical fibers. The glass optical fibers can be step-index glass optical fibers or graded-index glass optical fibers. The optical waveguides can be plastic, or polymer, optical fibers. The plastic optical waveguides can be step-index plastic optical fibers or graded-index plastic optical fibers. The optical waveguides can have a variety of cross-sectional shapes such as circular, square, and hexagonal. The optical waveguides can be held in the apertures by, for example, the light detectors at the second surface of the grid and by, for example, a protective panel at the first surface of the grid.

The scintillating material used in the optical waveguides can absorb x-ray radiation over at least a portion of the range 500 keV to 100 MeV, can absorb x-ray radiation over at least a portion of the range 500 keV to 6 MeV, can absorb x-ray radiation over at least a portion of the range 500 keV to 10 MeV, and/or can absorb x-ray radiation over at least a portion of the range 500 keV to 25 MeV.

Each scintillator element can have 10 or more optical waveguides. In a specific embodiment, a single optical fiber is used as a scintillator element. The grid can have a variety of shapes and sizes. Each aperture can have a diameter in the range of 0.2 mm to 2 cm, and/or in the range of 0.5 mm to 1 cm. The grid can have a wall thickness between adjacent apertures in the range of 0.02 mm to 0.2 mm. The grid can have cross-sectional dimensions of at least 10 cm by 10 cm, 15 cm by 15 cm, at least 20 cm by 20 cm, at least 25 cm, by 25 cm, and/or at least 30 cm by 30 cm. The apertures can be at least 10 cm long, at least 20 cm long, at least 40 cm long, and/or at least 90 cm long. The plurality of apertures through the grid can have parallel longitudinal axes or can have longitudinal axes that are not all parallel to each other. In a specific embodiment, advantageous for use with point source x-ray radiation sources, the plurality of apertures have longitudinal axes angled with respect to a longitudinal axis of the grid such that the longitudinal axes of the apertures intersect a portion a plane that has a smaller cross-sectional area than the grid, wherein the plane is positioned a first distance from the grid and is parallel to a first surface of the grid, where the first ends of the apertures are on the first surface of the grid. In a specific embodiment, the longitudinal axes of the apertures intersect with the x-ray source.

A variety of light detectors can be used. In a specific embodiment, the plurality of light detectors form a photodiode array. The photodiode array can be an array of a-Si photodiodes.

Embodiments can incorporate a x-ray radiation source. When x-ray radiation from the x-ray radiation source is incident on the first surface of the grid the scintillating material absorbs the incident x-ray radiation and emits light, such that at least a portion of the emitted light is guided by the corresponding optical waveguide to the second end of the aperture.

Embodiments of the subject method involve illuminating the grid with x-ray radiation that has passed through an object, detecting light exiting the second ends of the plurality of apertures via the plurality of light detectors, and creating an image of the object from the detected light.

Specific embodiments of the invention are directed to a high performance radiographic imaging method and apparatus incorporating high light output clear scintillators that are inserted into a high atomic number grid, such as a tungsten grid, and optically matched to a plurality of light detectors, such as an array of a-Si photodiodes. Thick, high light output, scintillator-tungsten beds can provide high contrast and the grid septa between scintillator elements can stop secondary electrons and enhance spatial resolution. Additional embodiments of the invention relate to a cost effective methodology involving mass producing grids, for example tungsten alloy grids, by stack laminating microlayers fabricated by lithography. Other gird materials can be used, such as metals, metal alloys, and metal doped substrates. A specific embodiment employs tomolithographic molding (TLM). Scintillator elements, such as individually grown crystals, sieved crystal elements, glass optical fibers, plastic optical fibers, and synthetically drawn glass/plastic scintillators, can be inserted via automated electrostatic/vacuum gradient based pixel loading or serially with a robotic arm. This technique provides a cost effective, accurate and mass producible method for obtaining high perfoimance x-ray/gamma ray imagers. A specific embodiment of the subject method results in accurate fabrication (+10 μm) that is cost effective and automated.

Figure 2:
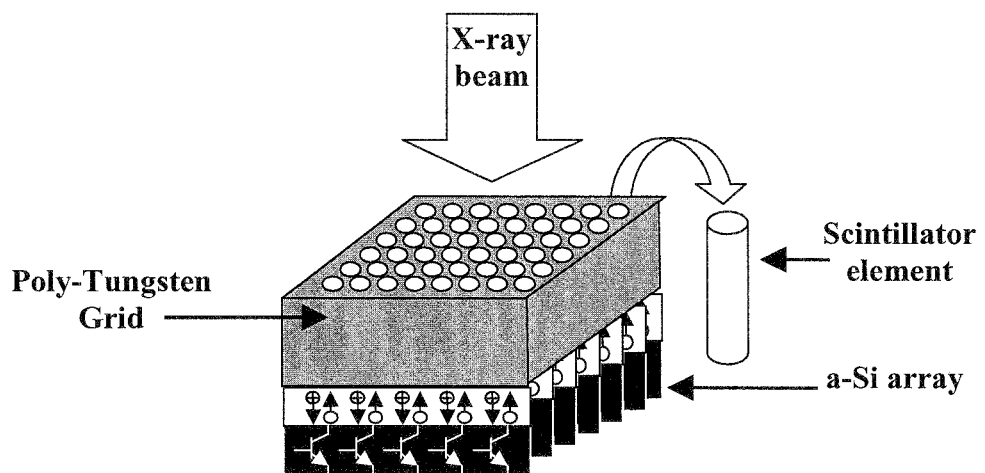
FIG. 2 shows a schematic of an embodiment of an a-Si coupled scintillator-tungsten bed detector in accordance with an embodiment of the subject invention.
Figure 5:
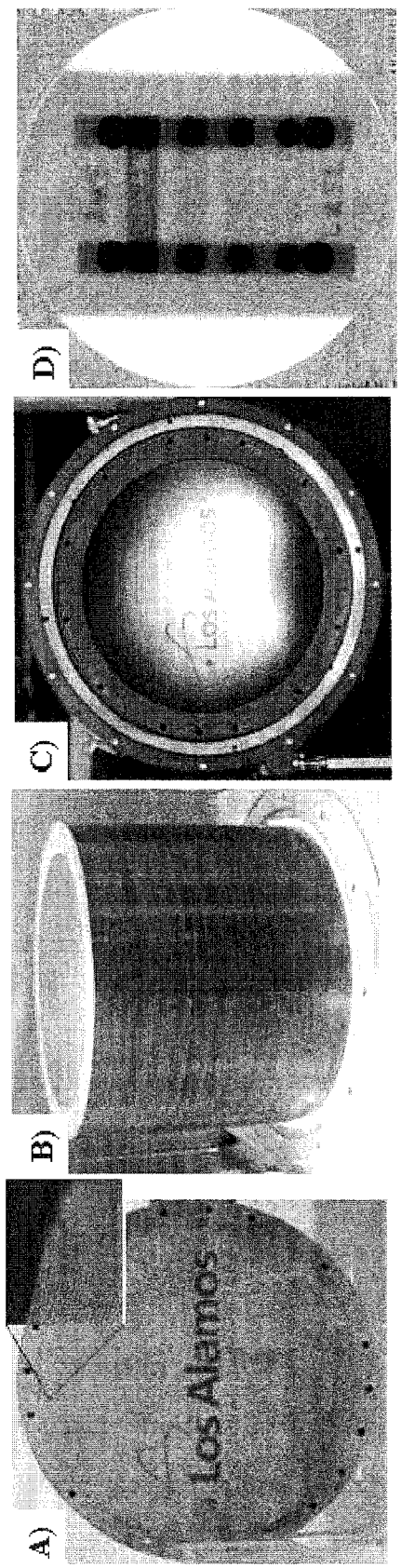
FIG. 5A shows an LSO structured scintillator array in accordance with an embodiment of the subject invention.
FIG. 5B shows a stack of 120 tungsten castings for 40 cm field of view (FOV) Bucky grid.
FIG. 5C shows a Bucky grid co-aligned with the Lutetium Oxyorthosilicate (LSO) array in accordance with an embodiment of the subject invention.
FIG. 5D shows a radiograph of low contrast tantalum foils through 12 inches of steel in accordance with an embodiment of the subject invention.

In order to produce high quantum efficiency (QE) detectors, thick clear crystalline scintillators made from materials, such as CsI, BGO and $CdWO_4$, or drawn materials, such as glass and plastic, can be used to provide greater light output to the a-Si arrays or other light detectors such as photo multiplier tubes (PMT's). A variety of scintillating materials can be used, such as inorganic and organic scintillation media such as Cesium Iodide (Tl doped), BGO, LSO, CWO, PWO, and CHI scintillation glass. Referring to FIG. 1, these scintillators may be inserted into a grid made out of a high atomic number medium, such as tungsten, to limit the spread of secondary electrons and preserve spatial resolution and then coupled to an a-Si array or other light detectors. One embodiment of a thick scintillator-tungsten bed detector is shown in FIG. 2. Embodiments of the subject a-Si coupled scintillator-tungsten bed detector can reduce the thickness trade-off between QE and spatial resolution, such that the thickness can be increased for greater QE with a much lower reduction in spatial resolution.

Embodiments of the subject invention also relate to a system for modeling and designing thick scintillator-tungsten bed detectors for high performance radiography. In a specific embodiment, Monte Carlo simulation modeling can be used to characterize intrinsic radiographic performance as a function of detector geometry for one or more detector designs. Such simulation modeling can be utilized for the design of thick scintillator-tungsten bed detectors. Further embodiments pertain to a method for fabricating thick scintillator-tungsten bed detectors for high performance radiography. In another specific embodiment, a scintillator-tungsten bed can be fabricated using tomolithography. Referring to FIG. 3, the fabrication can begin with precision stack lamination as a master to create a high-resolution casting mold from which advanced grids can be produced. The benefits of lithography can be realized, with significant reductions in material and production costs. The engineered cast material used to manufacture collimators and anti-scatter grids can be made using a tungsten powder and polymer composite material having a density exceeding 12 $g/cm^3$.

Referring to FIGS. 4A and 4B, in a specific embodiment, the scintillator elements can be inserted into the tungsten bed using a dual vacuum/electrostatic gradient based automated loading tool, which can be approximately 100% successful in inserting the scintillator elements.

The scintillator-tungsten bed can then be coupled to a-Si read out arrays and image quality can be characterized using fundamental imaging measurements. Specific embodiments can provide accurate (±10 μm) mass production of scintillator-tungsten bed detectors at 50% of the cost of conventional methods.

A specific embodiment of the subject invention relates to a fiber-optic scintillation glass array within a polymer-tungsten bed for megavoltage radiography. In a specific embodiment, TLM fabrication methodology was used to produce a thick tungsten anti-scatter grid designed to image 18 MeV x-rays with an LSO scintillator. The design specifications for this large area (45 cm diameter) grid included 131,589 focused holes (0.930 mm diameter) with a hole length of 40 cm, true position of collimator holes within 30 microns of the target position over the full 45 cm FOV, and a minimum density of 11 $g/cm^3$.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An apparatus for use in x-ray radiographic imaging, comprising:
   a grid having a plurality of apertures therethrough, wherein the grid comprises a grid material that reduces secondary electron transfer between apertures;
   a corresponding plurality of scintillator elements positioned within the plurality of apertures, wherein each of the scintillator elements comprises one or more optical fibers, wherein each optical fiber incorporates a scintillating material that absorbs x-ray radiation incident on a first end of the aperture, generates secondary electrons upon absorption of the x-ray radiation, and emits light upon absorption of the x-ray radiation, wherein at least a portion of the emitted light is guided by the corresponding optical fiber to a second end of the aperture.

2. The apparatus according to claim 1, further comprising:
   a corresponding plurality of light detectors, wherein each light detector is positioned to detect light emitted from the second end of the corresponding aperture.

3. The apparatus according to claim 1, wherein the grid material is Lutetium Oxyorthosilate.

4. The apparatus according to claim 1, wherein the grid material is lead.

5. The apparatus according to claim 1, wherein the grid material is steel.

6. The apparatus according to claim 1, wherein the grid material has an atomic number greater than Iron.

7. The apparatus according to claim 1, wherein the grid material is tungsten.

8. The apparatus according to claim 1, wherein the grid material is a polymer composite material.

9. The apparatus according to claim 8, wherein the polymer composite material has a density exceeding 12 g/cm$^3$.

10. The apparatus according to claim 8, wherein the grid is a Bucky grid.

11. The apparatus according to claim 1, wherein the grid material has an atomic number such that the x-ray radiation entering one of the apertures is screened from passing into adjacent apertures by the grid material.

12. The apparatus according to claim 1, wherein the optical fibers are glass optical fibers.

13. The apparatus according to claim 12, wherein the glass optical fibers are step-index glass optical fibers.

14. The apparatus according to claim 12, wherein the glass optical fibers are graded-index glass optical fibers.

15. The apparatus according to claim 1, wherein the optical fibers are plastic optical fibers.

16. The apparatus according to claim 15, wherein the plastic optical waveguides are step-index plastic optical fibers.

17. The apparatus according to claim 15, wherein the plastic optical waveguides are graded-index plastic optical fibers.

18. The apparatus according to claim 1, wherein the scintillating material absorbs x-ray radiation over at least a portion of the range 500 keV to 100 MeV.

19. The apparatus according to claim 1, wherein the scintillating material absorbs x-ray radiation over at least a portion of the range 500 keV to 6 MeV.

20. The apparatus according to claim 1, wherein the scintillating material absorbs x-ray radiation over at least a portion of the range 500 keV to 10 MeV.

21. The apparatus according to claim 1, wherein the scintillating material absorbs x-ray radiation over at least a portion of the range 500 keV to 25 MeV.

22. The apparatus according to claim 1, wherein each scintillator element is one optical fiber.

23. The apparatus according to claim 1, wherein each aperture has a diameter in the range of 0.2 mm to 2 cm.

24. The apparatus according to claim 1, wherein each aperture has a diameter in the range of 0.5 mm to 1 cm.

25. The apparatus according to claim 1, wherein the grid has a wall thickness between adjacent apertures in the range of 0.02 mm to 0.2 mm.

26. The apparatus according to claim 1, wherein the grid has cross-sectional dimensions of at least 15 cm by 15 cm.

27. The apparatus according to claim 1, wherein the plurality of apertures have parallel longitudinal axes.

28. The apparatus according to claim 1, wherein the first ends of the apertures are on a first surface of the grid, wherein the plurality of apertures have longitudinal axes angled with respect to a longitudinal axis of the grid such that the longitudinal axes of the apertures intersect a portion of a plane that has a smaller cross-sectional area than a portion of the first surface of the grid intersected by the longitudinal axes of the aperture, wherein the plane is positioned a first distance from the first surface of the grid and is parallel to the first surface of the grid.

29. The apparatus according to claim 2, wherein the plurality of light detectors comprises a photodiode array.

30. The apparatus according to claim 29, wherein the photodiode array is an array of a-Si photodiodes.

31. The apparatus according to claim 1, wherein the apertures are at least 10 cm long.

32. The apparatus according to claim 1, wherein the apertures are at least 20 cm long.

33. The apparatus according to claim 1, wherein the apertures are at least 40 cm long.

34. The apparatus according to claim 1, wherein the apertures are at least 90 cm long.

35. The apparatus according to claim 1, further comprising:
   an x-ray radiation source, wherein when x-ray radiation from the x-ray radiation source is incident on the first surface of the grid the scintillating material absorbs the incident x-ray radiation and emits light, wherein at least a portion of the emitted light is guided by the corresponding optical fiber to the second end of the aperture.

36. The apparatus according to claim 2, further comprising:
   an x-ray radiation source, wherein when x-ray radiation from the x-ray radiation source is incident on the first surface of the grid the scintillating material absorbs the incident x-ray radiation and emits light, wherein at least a portion of the emitted light is guided by the corresponding optical fiber to the second end of the aperture.

37. The apparatus according to claim 28, further comprising:
   an x-ray radiation source, wherein when x-ray radiation from the x-ray radiation source is incident on the first surface of the grid the scintillating material absorbs the incident x-ray radiation and emits light, wherein at least a portion of the emitted light is guided by the corresponding optical fiber to the second end of the aperture.

38. The apparatus according to claim 37, wherein the x-ray radiation source is a point source type x-ray radiation source located such that the x-ray radiation is emitted by the x-ray radiation source at an intersection of the longitudinal axes of the apertures.

39. A method of radiographic imaging, comprising:
providing a radiographic imaging apparatus, wherein the radiographic imaging apparatus comprises:
a grid having a plurality of apertures therethrough, wherein the grid comprises a grid material that absorbs x-ray radiation;
a corresponding plurality of scintillator elements positioned within the plurality of apertures, wherein each of the scintillator elements comprises one or more optical fibers, wherein each optical fibers incorporates a scintillating material that absorbs x-ray radiation incident on a first end of the aperture and emits light that is guided by the optical fibers to a second end of the aperture; and
a corresponding plurality of light detectors, wherein each light detector is positioned to detect light emitted from the second end of the corresponding aperture;
illuminating the radiographic imaging apparatus with x-ray radiation that has interacted with an object;
detecting light exiting the second ends of the plurality of apertures via the plurality of light detectors; and
creating an image of the object from the detected light.

40. A method of producing an apparatus for x-ray radiography, comprising:
providing a grid having a plurality of apertures therethrough, wherein the grid is produced by stack laminating microlayers of grid material via lithography; and
one or more optical waveguides in each aperture, wherein each optical fiber incorporates a scintillating material that absorbs radiation incident on a first end of the aperture and emits light that is guided by the optical fiber to a second end of the aperture.

41. The method according to claim 40, wherein the grid is a tungsten alloy grid.

42. The method according to claim 40, wherein stack laminating microlayers of grid material via ligthography comprises stack laminating microlayers of grid material via tomolithographic molding.

43. The method according to claim 40, wherein positioning the one or more optical fibers in each aperture comprises inserting the one or more optical fibers into each aperture via automatic electrostatic gradient based pixel loading.

44. The method according to claim 40, wherein positioning the one or more optical fibers in each aperture comprises inserting the one or more optical fibers into each aperture via automatic vacuum gradient based pixel loading.

45. The method according to claim 40, wherein producing a grid comprises producing a master mold, producing a derived mold that is a negative of the master mold, producing a casting mold using the derived mold, and producing the grid via casting from the derived mold.

46. The method according to claim 39, wherein illuminating the radiographic imaging apparatus with x-ray radiation comprises illuminating the radiographic imaging apparatus with x-ray radiation that has passed through the object.

47. The apparatus according to claim 1, wherein the grid material reduces secondary electron transfer between apertures by absorbing secondary electrons generated upon absorption of x-ray radiation by the one or more optical fibers and incident on the grid material.

48. The apparatus according to claim 1, wherein the one or more optical fibers are positioned within the corresponding aperture of the plurality of apertures.

49. An apparatus for use in x-ray radiographic imaging, comprising:
a grid having a plurality of apertures therethrough, wherein the grid comprises a grid material that reduces secondary electron transfer between apertures;
a corresponding plurality of scintillator elements positioned within the plurality of apertures, wherein each of the scintillator elements comprises one or more optical waveguides, wherein each optical waveguide incorporates a scintillating material that absorbs x-ray radiation incident on a first end of the aperture, generates secondary electrons upon absorption of the x-ray radiation, and emits light upon absorption of the x-ray radiation, wherein the emitted light is guided by the optical waveguide out a second end of the aperture, wherein the plurality of apertures extend from a first surface of the grid to a second surface of the grid, wherein for each aperture of the plurality of apertures the first end of the aperture is on the first surface of the grid and the second end of the aperture is on the second surface of the grid, wherein the one or more optical waveguides are positioned completely within the corresponding aperture of the plurality of apertures within a region from the first end of the aperture to the second end of the aperture.

50. An apparatus for use in x-ray radiographic imaging, comprising:
a grid having a plurality of apertures therethrough, wherein the grid comprises a grid material that reduces secondary electron transfer between apertures;
a corresponding plurality of scintillator elements positioned within the plurality of apertures, wherein each of the scintillator elements comprises one or more optical waveguides, wherein each optical waveguide incorporates a scintillating material that absorbs x-ray radiation incident on a first end of the aperture, generates secondary electrons upon absorption of the x-ray radiation, and emits light upon absorption of the x-ray radiation, wherein the emitted light is guided by the optical waveguide out a second end of the aperture, wherein each optical waveguide incorporates the scintillating material throughout the optical waveguide.

51. The apparatus according to claim 1, wherein a portion of the secondary electrons generated upon absorption of the x-ray radiation by the scintillating material is absorbed by the scintillating material and causes the scintillating material to emit additional light upon absorption of the portion of the secondary electrons, wherein a portion of the additional light is guided by the corresponding optical fiber to the second end of the aperture.

52. An apparatus, comprising:
a grid having a plurality of apertures therethrough;
a corresponding plurality of scintillator elements positioned within the plurality of apertures, wherein each scintillator element of the plurality of scintillator elements comprises a corresponding one or more optical fibers, wherein the one or more optical fibers are positioned within the corresponding aperture of the plurality of apertures, wherein each optical fiber of the one or more optical fibers incorporates a scintillating material, wherein the apparatus is configured such that the scintillating material absorbs x-ray radiation incident on a first end of the corresponding aperture and emits light upon absorption of the x-ray radiation, wherein a portion of the light emitted by the scintillating material upon absorption of the x-ray radiation is guided by the corresponding optical fiber to a second end of the corresponding aperture.

53. The apparatus according to claim 52, wherein the scintillating material generates secondary electrons upon absorption of the x-ray radiation, wherein a portion of the secondary electrons generated upon absorption of the x-ray radiation by the scintillating material is absorbed by the scintillating material and causes the scintillating material to emit additional light upon absorption of the portion of the secondary electrons, wherein a portion of the additional light is guided by the corresponding optical fiber to the second end of the aperture.

54. The apparatus according to claim 52, wherein the grid material reduces secondary electron transfer between apertures by absorbing secondary electrons generated upon absorption of the x-ray radiation by the one or more optical fibers and incident on the grid material.

55. The apparatus according to claim 52, wherein the plurality of apertures extend from a first surface of the grid to a second surface of the grid, wherein for each aperture of the plurality of apertures the first end of the aperture is on the first surface of the grid and the second end of the aperture is on the second surface of the grid, wherein the one or more optical fibers are positioned completely within the corresponding aperture of the plurality of apertures within a region from the first end of the aperture to the second end of the aperture.

* * * * *

UNITED STATES PATENT AND TRADEMARK OFFICE
CERTIFICATE OF CORRECTION

PATENT NO. : 8,842,809 B2
APPLICATION NO. : 12/996718
DATED : September 23, 2014
INVENTOR(S) : Sanjiv Singh Samant and Arun Gopal It is certified that error appears in the above-identified patent and that said Letters Patent is hereby corrected as shown below:

In the Specification

Column 4,
Line 4, "high perfoimance" should read --high performance--.

In the Claims

Column 7,
Lines 17-18, Claim 39, "each optical fibers incorporates" should read --each optical fiber incorporates--.
Line 20, Claim 39, "by the optical fibers to a" should read --by the optical fiber to a--.
Lines 35-36, Claim 40, "one or more optical waveguides in each aperture, wherein each optical fiber incorporates" should read --positioning one or more optical waveguides in each aperture, wherein each fiber incorporates--.

Column 8,
Lines 17-18, Claim 49, "wherein the emitted light is guided by the optical waveguide out a" should read --wherein at least a portion of the emitted light is guided by the corresponding optical waveguide to a--.
Lines 41-42, Claim 50, "wherein the emitted light is guided by the optical waveguide out a" should read --wherein at least a portion of the emitted light is guided by the corresponding optical waveguide to a--.

Signed and Sealed this
Twelfth Day of May, 2015

Michelle K. Lee
*Director of the United States Patent and Trademark Office*